US012669696B2

(12) United States Patent (10) Patent No.: US 12,669,696 B2
Teetzel et al. (45) Date of Patent: Jun. 30, 2026

(54) NIGHT VISION RECORDING AND DISPLAY MODULE FOR MONOCULAR DEVICE AND SYSTEM EMPLOYING THE SAME

(71) Applicant: WILCOX INDUSTRIES CORP., Newington, NH (US)

(72) Inventors: James W. Teetzel, Portsmouth, NH (US); Gary M. Lemire, Lee, NH (US); Roula Assadi, Stratham, NH (US)

(73) Assignee: Wilcox Industries Corp., Newington, NH (US)

( * ) Notice: Subject to any disclaimer, the term of this patent is extended or adjusted under 35 U.S.C. 154(b) by 237 days.

(21) Appl. No.: 18/614,250

(22) Filed: Mar. 22, 2024

(65) Prior Publication Data

US 2024/0319488 A1 Sep. 26, 2024

Related U.S. Application Data

(60) Provisional application No. 63/534,709, filed on Aug. 25, 2023, provisional application No. 63/454,689, filed on Mar. 26, 2023.

(51) Int. Cl.
| | |
|---|---|
| *G02B 23/04* | (2006.01) |
| *G02B 23/12* | (2006.01) |
| *G02B 23/16* | (2006.01) |
| *G02B 25/00* | (2006.01) |
| *H04N 5/33* | (2023.01) |
| *H04N 23/23* | (2023.01) |

(52) U.S. Cl.
CPC ............. *G02B 23/12* (2013.01); *G02B 23/04* (2013.01); *G02B 23/16* (2013.01); *G02B*

*25/001* (2013.01); *H04N 5/33* (2013.01); *G02B 23/125* (2013.01); *H04N 23/23* (2023.01)

(58) Field of Classification Search
CPC ...... G02B 23/04; G02B 23/12; G02B 23/125; G02B 23/16; G02B 25/001; H04N 5/33; H04N 23/20–23
See application file for complete search history.

(56) References Cited

U.S. PATENT DOCUMENTS

| | | |
|---|---|---|
| 8,531,592 B2 | 9/2013 | Teetzel et al. |
| 2002/0126363 A1 | 9/2002 | Ziv et al. |
| | (Continued) | |

FOREIGN PATENT DOCUMENTS

EP 1857854 A1 11/2007

OTHER PUBLICATIONS

Extended European Search Report in Application No. 24166140.4 dated Oct. 9, 2024, 12 pages.
(Continued)

*Primary Examiner* — Ryan S Dunning
(74) *Attorney, Agent, or Firm* — McLane Middleton, Professional Association

(57) ABSTRACT

In one aspect, a night vision recording and display module for removably attachment to night vision monocular device is provided. In another aspect, a night vision recording and display module further includes an integrated camera, preferably a thermal camera, which produces a video image which can be superimposed with the night vision display output. In yet further aspects, combinations or kits comprising the modular night vision systems disclosed herein in combination with the night vision devices are provided.

17 Claims, 15 Drawing Sheets

(56)     References Cited

U.S. PATENT DOCUMENTS

| | | | |
|---|---|---|---|
| 2007/0084985 A1 | 4/2007 | Smith et al. | |
| 2007/0267567 A1* | 11/2007 | Filipovich | G02B 23/125 |
| | | | 250/214 VT |
| 2008/0170838 A1 | 7/2008 | Teetzel et al. | |
| 2020/0019042 A1 | 1/2020 | Crispin | |
| 2020/0259990 A1* | 8/2020 | Thomas | G02B 23/125 |

OTHER PUBLICATIONS

Partial European Search Report in Application No. 24166140.4 dated Jul. 26, 2024, 10 pages.

\* cited by examiner

NIGHT VISION RECORDING AND DISPLAY MODULE FOR MONOCULAR DEVICE AND SYSTEM EMPLOYING THE SAME

CROSS-REFERENCE TO RELATED APPLICATIONS

This application claims the priority benefit of U.S. provisional application Ser. No. 63/534,709 filed Aug. 25, 2023, and 63/454,689 filed Mar. 26, 2023. Each of the aforementioned applications is incorporated herein by reference in its entirety.

BACKGROUND

The present invention relates to night vision devices and, in particular, to modular recording and display modules and systems for a night vision device.

SUMMARY

In one aspect, a recording and display head for a night vision device, comprises a main housing having a viewing end and an input end, the main housing configured to couple to an output end of the night vision device. A beam splitter is received within the main housing and disposed along an optical viewing path, the optical viewing path extending between the output end of the night vision device and the viewing end, the beam splitter configured to transmit a first portion of light output by the night vision device through the beam splitter and toward the viewing end. A video display is disposed within the main housing on a first side of the beam splitter, the video display configured to output a video image along a video optical path, wherein the beam splitter is configured to reflect a portion of the video image from the video optical path to the optical viewing path. A first camera is disposed within the main housing on a second side of the beam splitter, the first camera positioned along a recording optical path, the beam splitter configured to reflect a second portion of the light output by the night vision device from the optical viewing path to the recording optical path for capture by the first camera.

In a more limited aspect, the optical viewing path defines a longitudinal axis and the video optical path and recording optical path each extend in a direction generally transverse to the longitudinal axis.

In another more limited aspect, the video optical path and the recording optical path are spaced apart from each other along the longitudinal axis.

In another more limited aspect, the recording and display head further comprises an overmolded eye cup assembly configured to be detachably coupled to the viewing end, the overmolded eye cup assembly comprising a rigid polymer stiffener having a plurality of magnets positioned thereon, the magnets configured to align and magnetically attach to the viewing end, and a flexible eyecup formed of a moldable material overmolded about the rigid polymer stiffener.

In another more limited aspect, the display is selected from the group consisting of a liquid crystal (LCD) display, light emitting diode (LED) display, organic light emitting diode (OLED) display, active-matrix organic light-emitting diode (AMOLED) display, Super AMOLED display, micro-electromechanical systems (MEMS) display, liquid crystal on silicon (LCOS) display, and digital light processing (DLP) display.

In another more limited aspect, the main housing is configured to detachably couple to the output end of the night vision device.

In another more limited aspect, the beam splitter is selected from the group consisting of a partially reflective mirror and a dichroic mirror.

In another more limited aspect, the night vision device is a night vision monocular.

In another more limited aspect, the recording and display head further comprises a circuit board disposed within a circuit board housing coupled to the main housing, the circuit board housing defining a detachable electrical and mechanical interface between the recording and display head and a main body of the night vision device.

In another more limited aspect, the recording and display head further comprises a flex circuit on a flexible circuit substrate within the main housing, the flex circuit electrically coupling the video display and the first camera to the circuit board, wherein the flex circuit generally conforms to the inner wall of the main housing such that the flex circuit is positioned outside the viewing path, the video optical path, and the recording optical path.

In another more limited aspect, the recording and display head further comprises one or both of a processing unit configured to execute program instructions and a memory storing instructions executable by the processing unit and video processing electronics configured to convert a video signal from the first camera to a digital representation for storage on a digital storage medium.

In another more limited aspect, the recording and display head further comprises a radio frequency (RF) communication interface configured to transmit recorded video data.

In another more limited aspect, the recording and display head further comprises a second camera operably coupled to the video display, the video display configured to output video images acquired by the second camera along the video optical path.

In another more limited aspect, the second camera is a thermal camera.

In another more limited aspect, the recording and display head further comprises an interface ring slidable with respect to the input end of the main housing configured to rigidly couple to an adjustable eyepiece of the night vision device, wherein sliding movement of the interface ring with respect to the main housing permits the adjustable eyepiece to travel in a fore and aft direction without relative movement between the main housing and the night vision device.

In a further aspect, a night vision device comprises a first night vision monocular and the recording and display head in accordance with the present disclosure.

In more limited aspect, the night vision device further comprises a second night vision monocular and a second recording and display head. The second recording and display head comprises a second main housing having a viewing end and an input end, the second main housing configured to couple to an output end of the second vision monocular and a second beam splitter received within the second main housing and disposed along an optical viewing path of the second recording and display head. The optical viewing path of the second recording and display head extends between the output end of the second night vision monocular and the viewing end of the second recording and display head. The second beam splitter is configured to transmit a first portion of light output by the second night vision monocular through the second beam splitter toward the viewing end of the second recording and display head. A second video display is disposed within the second main housing on a first side of the second beam splitter, the second video display configured to output a video image along a video optical path of the second recording and display head. The second beam splitter is configured to reflect a portion of the video image from the video optical path of the second recording and display head to the optical viewing path of the second recording and display head. A second camera is disposed within the second main housing on a second side of the second beam splitter, the second camera positioned along a recording optical path of the second recording and display head. The second beam splitter is configured to reflect a second portion of the light output by the second night vision monocular from the optical viewing path of the second recording and display head to the recording optical path of the second recording and display head for capture by the second camera. A third camera is operably coupled to the second video display. The second video display is configured to output video images acquired by the third camera along the video optical path of the second recording and display head. A binocular bridge assembly is configured to couple the first and second night vision monoculars together.

In another more limited aspect, the third camera is a thermal camera.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

Figure 1:
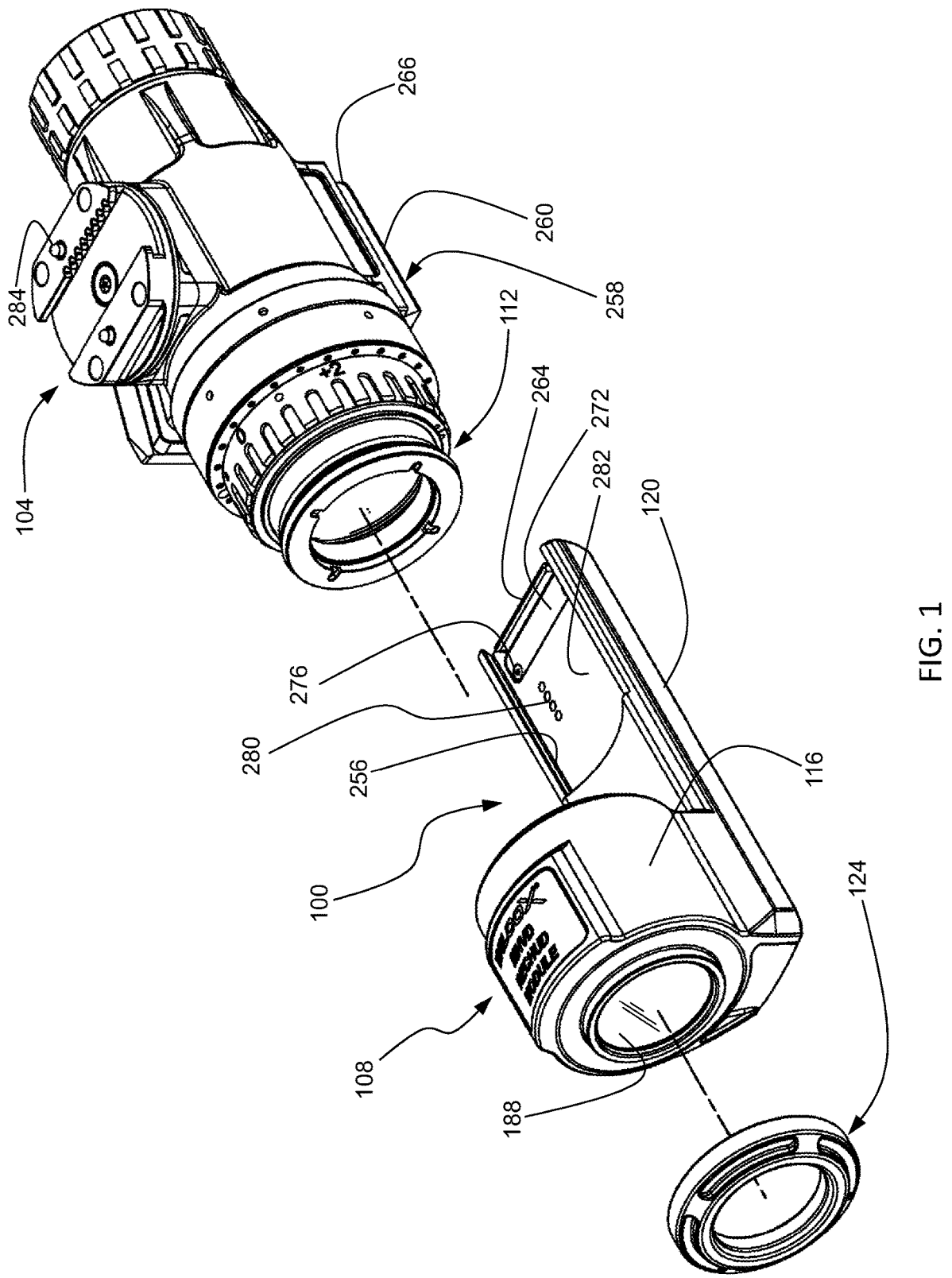
FIG. 1 is a partially exploded isometric view of a modular night vision system including the modular recording and display device herein with night vision monocular.

Referring now to the drawings, FIG. 1 shows a night vision recording and display module 100 and its manner of removable attachment to a night vision monocular device 104. In embodiments, the night vision monocular device 104 is as described in commonly-owned U.S. provisional application Ser. No. 63/450,799 filed Mar. 8, 2023, and commonly-owned U.S. nonprovisional application Ser. No.

18/590,352 filed Feb. 28, 2024, the entire contents of each of which is incorporated herein by reference in its entirety. It will be recognized that the night vision recording and display module 100 could be adapted for use with other night vision monocular devices.

Figure 2:
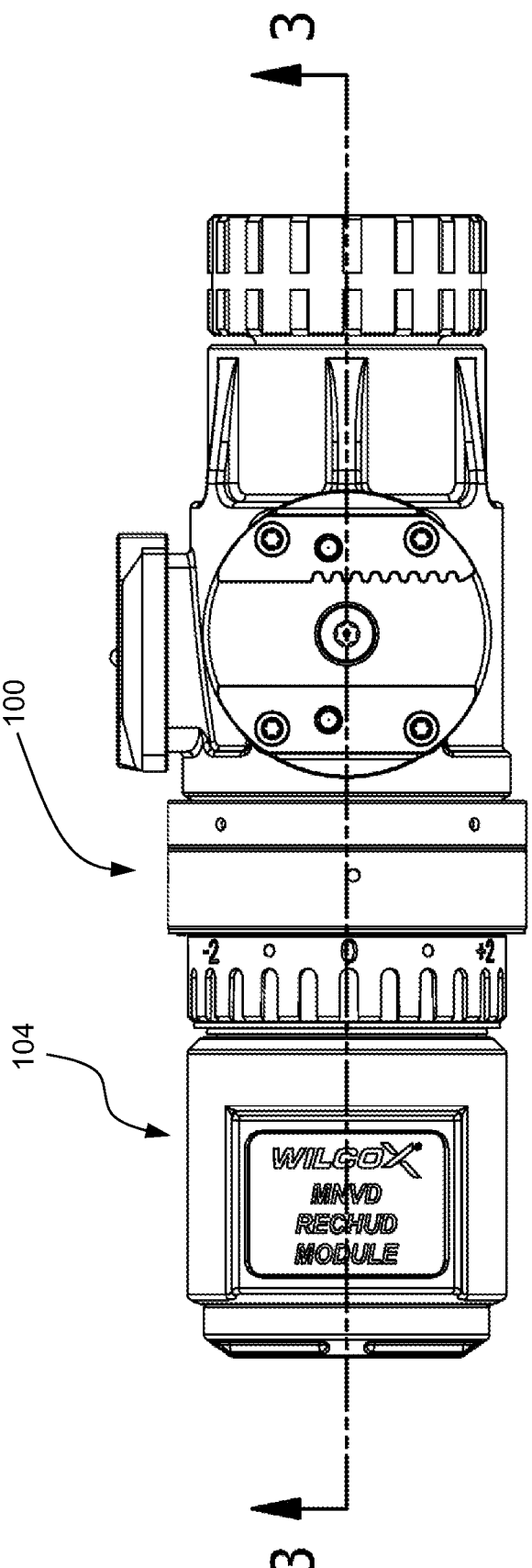
FIG. 2 is a top plan view of the night vision monocular modular recording and display device attached to the night vision monocular.

The night vision monocular device 104 includes recording and display head 108 which is coaxially received over an eyepiece assembly 112 of the night vision monocular device 104. The recording and display head 108 includes a main, e.g., generally cylindrical, housing 116, which may be formed, e.g., of a polymer material. The night vision recording and display module 100 further includes a circuit board housing 120 which extends rearwardly from the recording and display head 108. An overmolded eyecup 124 is detachably secured to the viewing end of the recording and display head 108. FIG. 2 depicts a top view of the night vision recording and display module 100 attached to a night vision monocular device 104.

Figure 3:
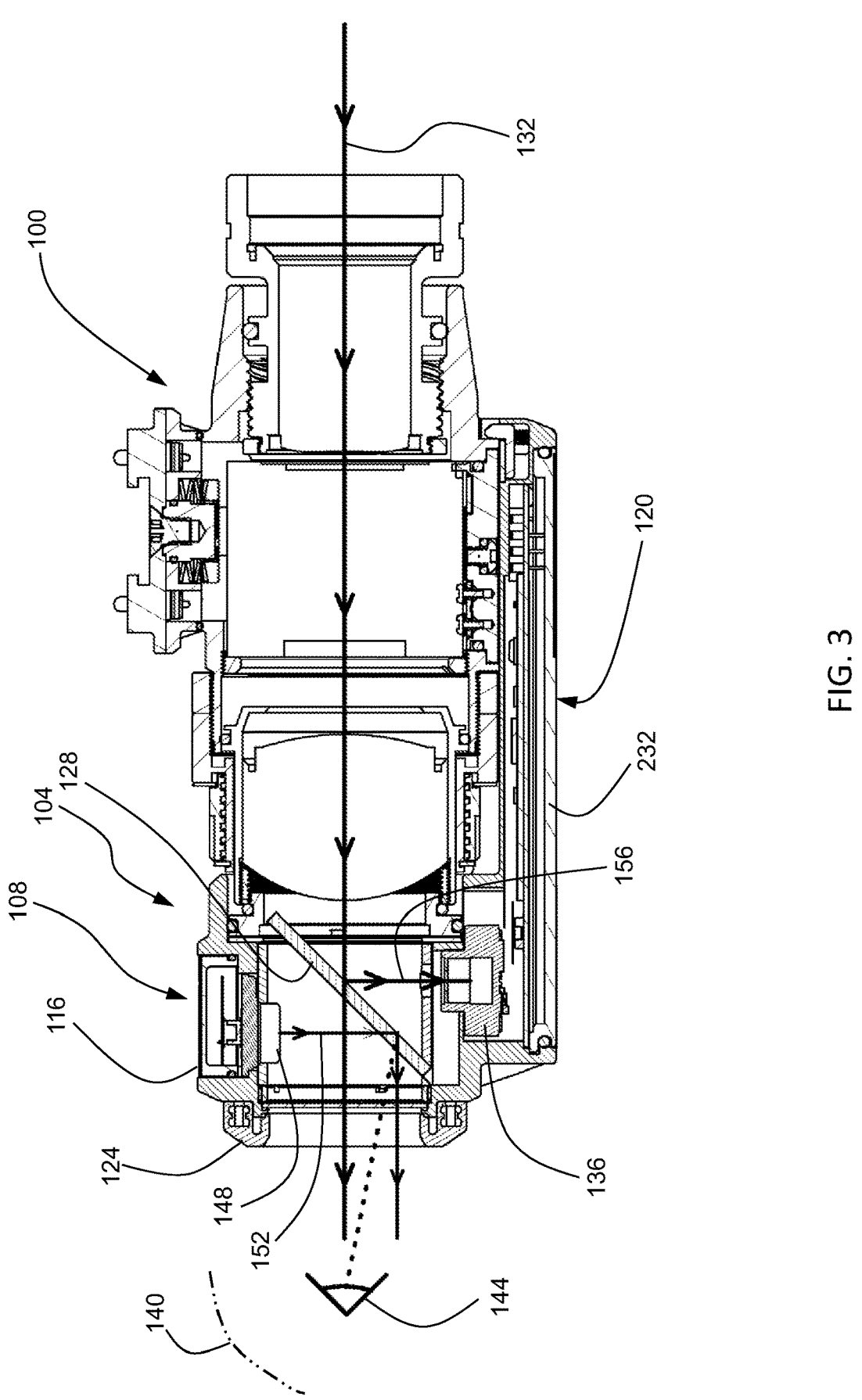
FIG. 3 is a side cross-sectional view taken along the lines 3-3 appearing in FIG. 2.

FIG. 3 is a side cross-sectional view of the night vision recording and display module 100 assembled together with the night vision monocular device 104. The main housing 116 includes a beam splitter 128 which is disposed along an optical axis 132 of the night vision monocular device 104. In embodiments, the beam splitter 128 is inclined at a 45 degree angle with respect to the optical axis 132. In embodiments, the beam splitter 128 is a partially reflective mirror configured to reflect a portion of the incoming light to a camera module 136 disposed within the housing 116 on one side of the beam splitter 128, and to transmit the remaining portion of the incoming light to an eye 144 of a user 140. Alternatively, the beam splitter 128 may be a dichroic mirror configured to reflect certain wavelengths of light while transmitting others. In this manner, the user can use the night vision recording and display module 100 to simultaneously view and record a scene viewed through the night vision monocular device 104.

A video display 148 is disposed within the housing 116 on the side of the beam splitter 128 opposite the camera 136. In embodiments, the video display is a liquid crystal (LCD) display, light emitting diode (LED) display, organic light emitting diode (OLED) display, active-matrix organic light-emitting diode (AMOLED) display, Super AMOLED display, and the like. It will be recognized that other display types can also be used, such as microelectromechanical systems (MEMS) displays, liquid crystal on silicon (LCOS) displays, digital light processing (DLP) displays, and others. In embodiments, the camera 136 comprises a charge-coupled device (CCD) sensor arrays, complementary metal-oxide-semiconductor (CMOS) sensor array, N-type metal-oxide-semiconductor (NMOS) sensor array, or the like.

The beam splitter 128 is configured to reflect at least a portion of the video displayed by the display 148 to the user's eye 144. The displayed video images may comprise text, numeric, or other indicia which is superimposed on the image output by the night vision device. Such text, numeric, or other indicia may be informational in nature or configured to provide enhanced situational awareness. Alternatively or additionally, the displayed video images may be configured to combine the night vision imagery with imagery from another imaging modality, such as a thermal camera, short-wave infrared camera, or the like to provide multimodality imaging. In this manner, the night vision monocular device can approximate an enhanced night vision device (eNVG) imaging device. In still further embodiments, positioning and orientation sensors in the unit 100 may be provided and used to display prerecorded images of the scene being viewed by the user to provide a mixed reality or augmented reality viewing experience.

In certain embodiments, it is desired to record only the scene as it is viewed through the night vision monocular device 104 without recording the images from the display 148. For example, in the illustrated embodiment, an optical axis 152 of the display 148 is offset from an optical axis 156 of the camera 136 along the optical axis 132. In certain embodiments, a light trap or other light absorptive material may be provided within the housing 116 to prevent unwanted light output by the display from reaching the camera or otherwise minimize unwanted scattered light or reflections within the housing 116.

In certain embodiments, where it is desired to record both the scene as it is viewed through the night vision monocular device 104 as well as the output of the display 148, the optical axis 152 of the camera 136 can be aligned with the optical axis 156 of the camera 136 along the optical axis 132, such that the portion of the video display output that is transmitted by the beam splitter 128 is recorded by the camera along with the reflected portion of the light from the image intensifier tube of the night vision monocular device 104.

Figure 4:
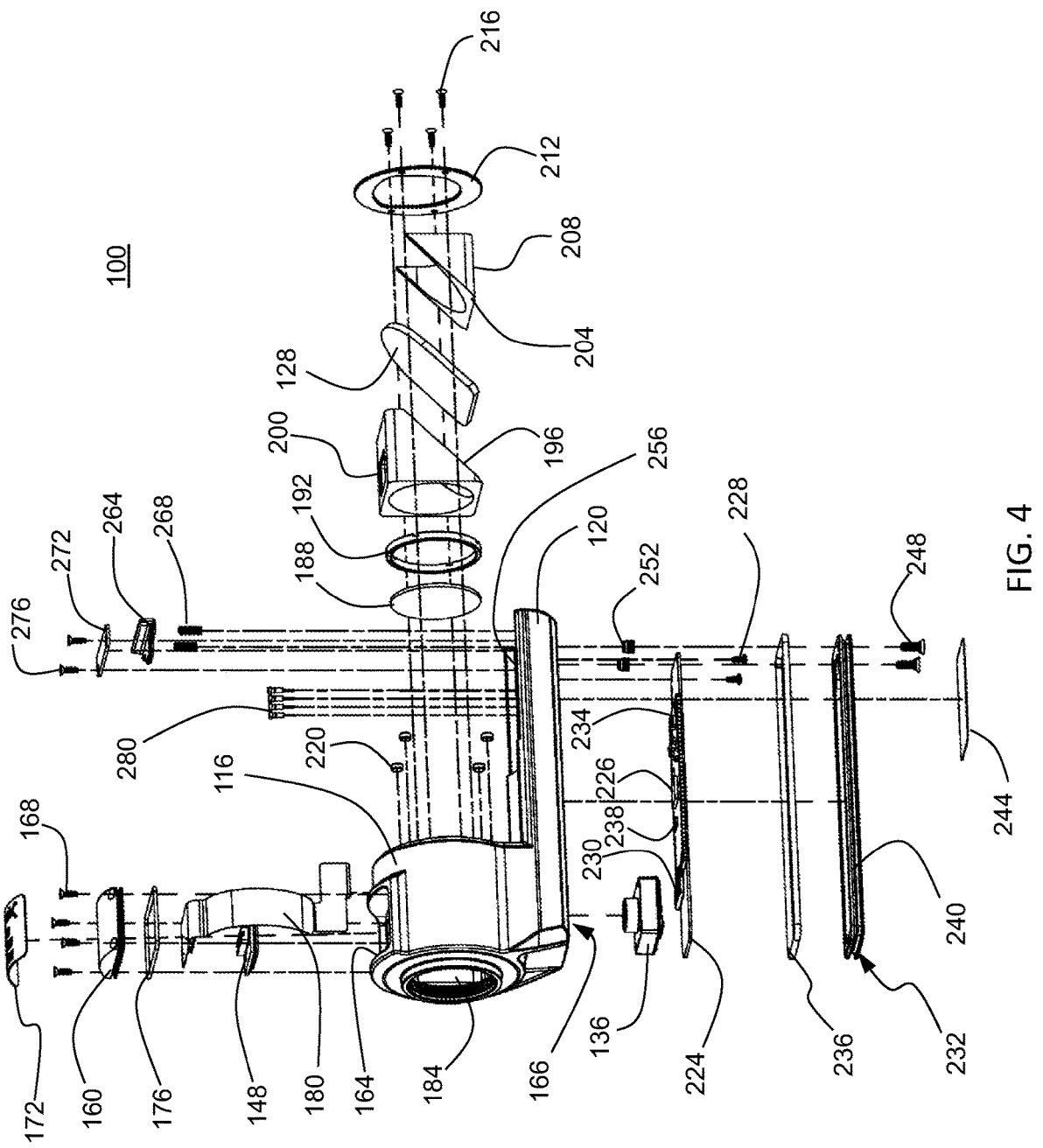
FIG. 4 is an exploded view of the modular recording and display device.

Referring now to FIG. 4, the housing 116 includes a cover 160 covering an upper opening 164. The cover 160 may be secured with threaded fasteners 168. A product label 172, such as an adhesive label, is attached to the cover 160. A sealing ring or gasket 176 is disposed about the upper opening 164 to prevent entry of moisture or other environmental contamination. The display 148 is received within the opening 164.

The camera 136 is received within a lower opening 166 in the housing 116. A flex circuit assembly 180 is received within the aperture defined by the housing 116. The flex circuit assembly 180 comprises circuit components on a flexible substrate such as a flexible film substrate. The flex circuit assembly 180 is operably coupled at its lower end to a circuit board 224 and the camera 136, and at its upper end to the display 148. The flexible substrate allows the flex circuit assembly 180 to curve around the inside of the aperture defined by the housing 116. Four magnets 220 are received within the housing 116 and are aligned with corresponding magnets 216 in the eyepiece 112 for removably attaching the eyepiece 112 to the housing 116. In certain embodiments, the magnets 220 are neodymium magnets.

A protective window 188 is received within the housing 116 and is retained by a retaining ring 192. The beam splitter 128 is disposed between a rear wedge 196 and a front wedge 204. The rear wedge 196 has an upper and central opening 200 to allow light rays from the display 148 to pass to the beam splitter 128 and to allow rays from the image intensifier of the night vision monocular device 104 to pass therethrough. The forward wedge 204 has a lower and central opening 208 to allow light rays from the image intensifier of the night vision monocular device 104 to pass to the beam splitter 128 and to allow rays that are reflected by the beam splitter 128 to pass to the camera 136. The window 188, retaining ring 192, and wedges 196 and 204, are retained within the housing 116 by a trim ring 212 which is secured to the open rearward end of the housing 116.

The circuit board 224 comprises a central processing unit (CPU) 226, which includes an associated memory comprising program instructions, an inertial measurement unit (IMU) 230 comprising sensors such as accelerometers, gyroscopes, and magnetometers for measuring motion, orientation, and relative position, a wireless communication module 234, and video processing electronics 238, which may be a dedicated video processor, or alternately, which may be implemented in software on the CPU 226.

The circuit board 224 is received within the circuit board housing 120 and secured with threaded fasteners 228. Power contacts 280 on the circuit board 224 extend through aligned openings in a circuit cover 282 and engage complementary power contacts (not shown) on a power contact boss 258 on the night vision monocular device 104. The power contacts 280 receive power for powering the camera 136, display 148, and processing and other electronics on the circuit board 224 via power input to the night vision monocular device 104 via power contacts 284. A bottom cover 232 closes the circuit board housing 120. A sealing ring 236 engages an annular groove 240 on the cover 232 to prevent entry of moisture and external contamination. A product label 244, such as an adhesive label, is attached to the cover 232.

The bottom cover 232 is secured to the housing 120 via threaded fasteners 248 which pass through aligned clearance openings in the cover and threadably engage threaded inserts 252 in the housing 120. The unit 100 is secured to the night vision monocular device 104 via dovetail receptacles 256 which engage complementary dovetail rails 260 on the power contact boss 258 on the night vision monocular device 104. The unit 100 is secured onto the night vision monocular device 104 via a spring loaded latch 264 which catches a forward edge 266 of the power contact boss 258. The latch 264 is urged upwardly by captured springs 268. The latch member 264 and the springs 268 are retained by a latch cover plate 272, which is secured via threaded fasteners 276. To detach the unit 100 from the night vision monocular device 104, the latch 264 is depressed against the urging of the springs 268 until it is below the edge 266 of the power contact boss 258.

Figure 5:
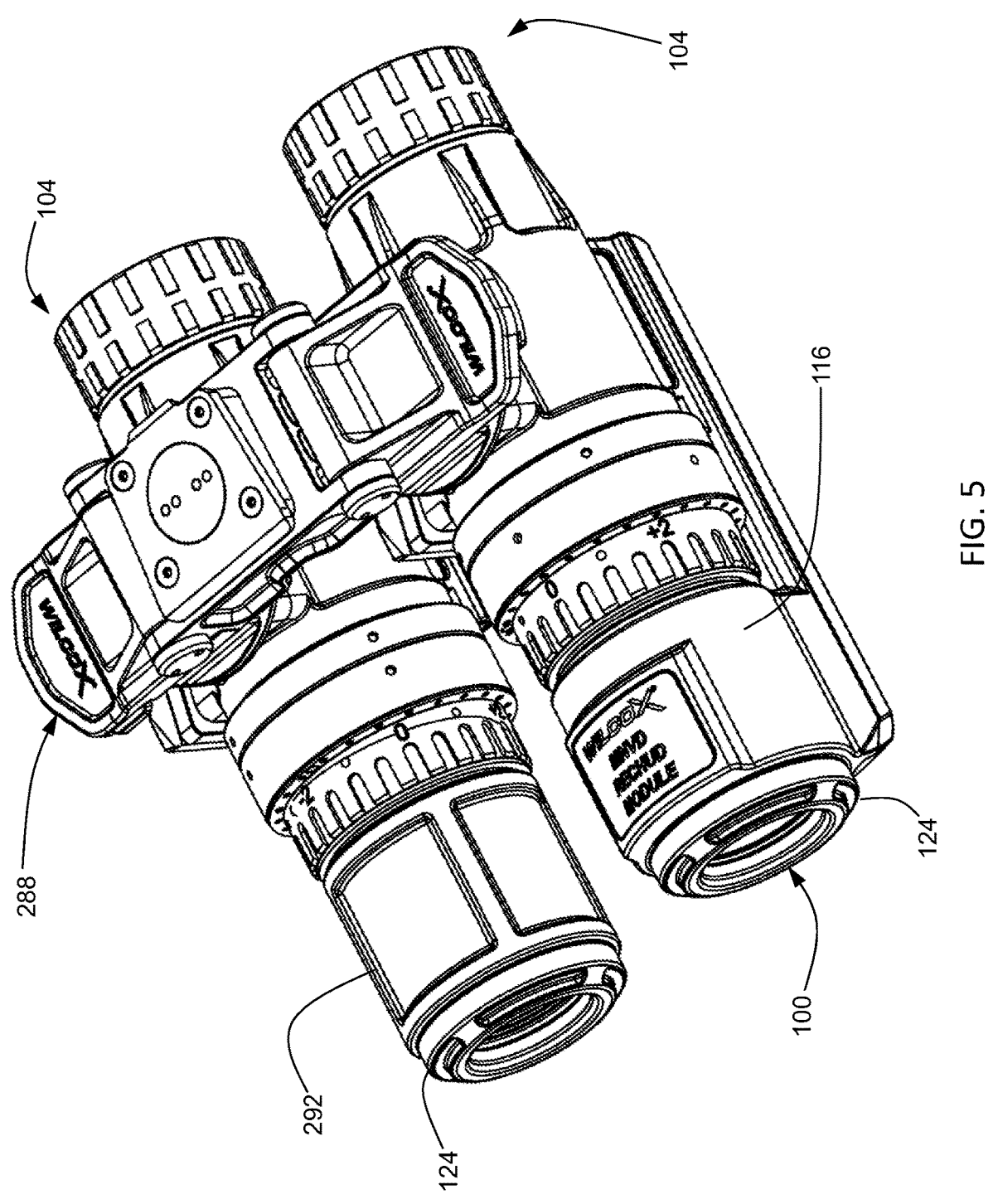
FIG. 5 is an isometric view of a binocular system comprising left and right night vision devices, having a modular recording and display device attached to the right monocular.

Referring now to FIG. 5, there is shown a pair of night vision monocular devices 104 configured as a binocular pair, which are attached to a powered, articulating binocular bridge 288. The bridge 288 may be as described in the aforementioned U.S. application Ser. Nos. 63/450,799 and 18/590,352. In the illustrated embodiment, the right night vision monocular device 104 has a night vision recording and display module 100 attached thereto and the left night vision monocular device 104 has an eyecup spacer 292 having an overmolded eyecup 124. The eyecup spacer 292 has an axial extent so that the eyecup 124 of the night vision recording and display module 100 and the eyecup 124 of the eyecup spacer 292 are the same distance from the user's eyes.

Figure 6:
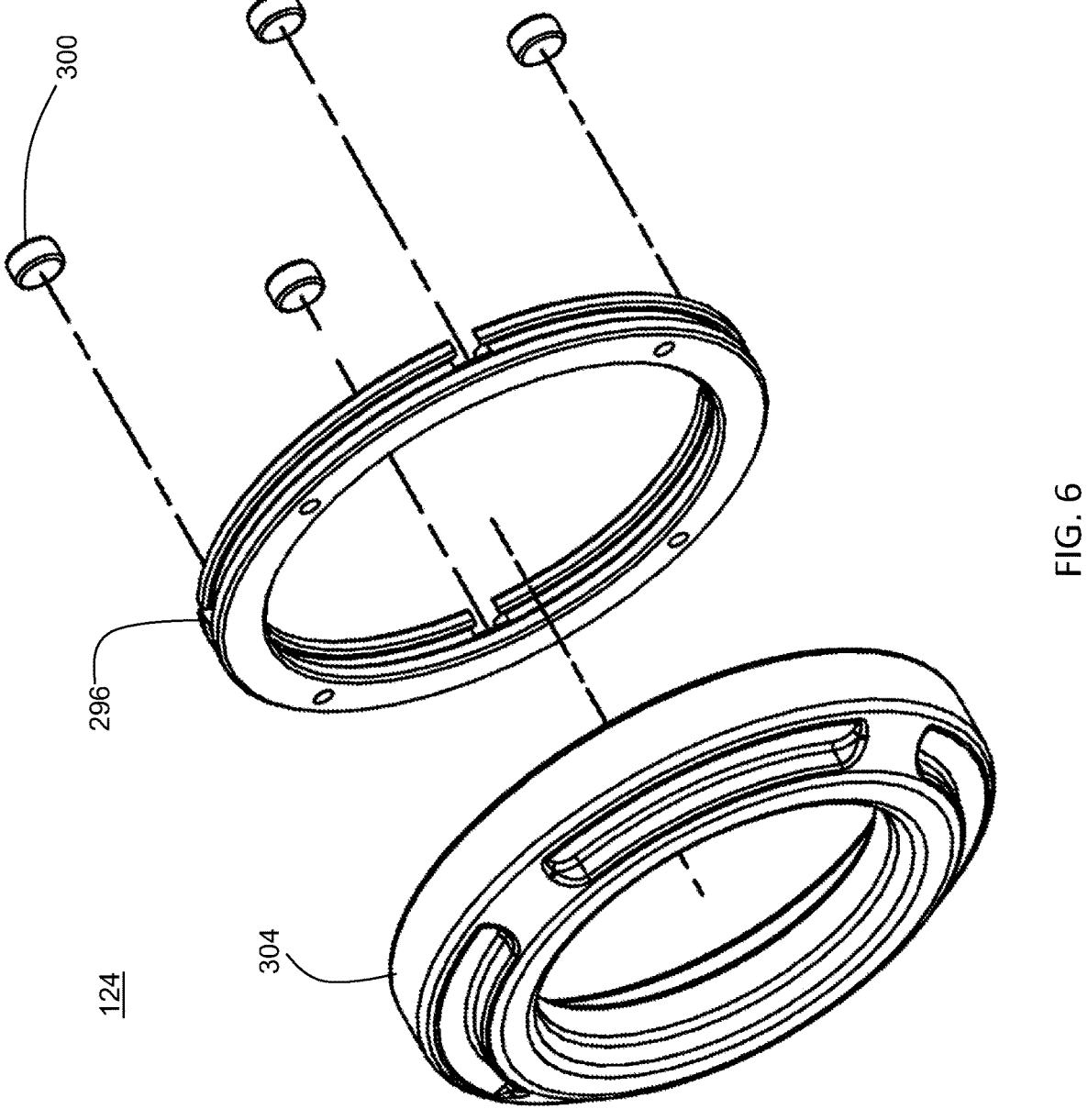
FIG. 6 is an enlarged view of the eyecup of the modular recording and display device, illustrating the overmolded construction.

Referring now to FIG. 6, there appears an overmolded eyecup assembly 124, which comprises a rigid polymer stiffener 296 having magnets 300 positioned therein. The magnets, which may be neodymium magnets, are configured to align and magnetically attach to the unit 100 via magnetic attraction to the magnets 220. The eyecup assembly 124 also includes a flexible eyecup 304 formed of a moldable material, which is overmolded about the stiffener 296.

As used herein, the terms "overmold," "overmolded," etc., refer to a process wherein a single part is created using two or more different materials in combination. Commonly, a first material, sometimes referred to as the substrate, is partially or fully covered by one or more subsequent materials ("overmold materials") during a manufacturing process. The substrate can include a machined metal part, a metal injection molded part, an additively manufactured metal or plastic part, a molded, machined, or additively manufactured plastic part, and so forth. The overmold material may be an injection moldable polymer composition. In a typical overmolding process, the substrate part is placed into an injection molding tool, at which point the overmold material is shot into, onto, or around the substrate. When the overmold material cures or solidifies, the two materials become joined together as a single part.

Figure 7:
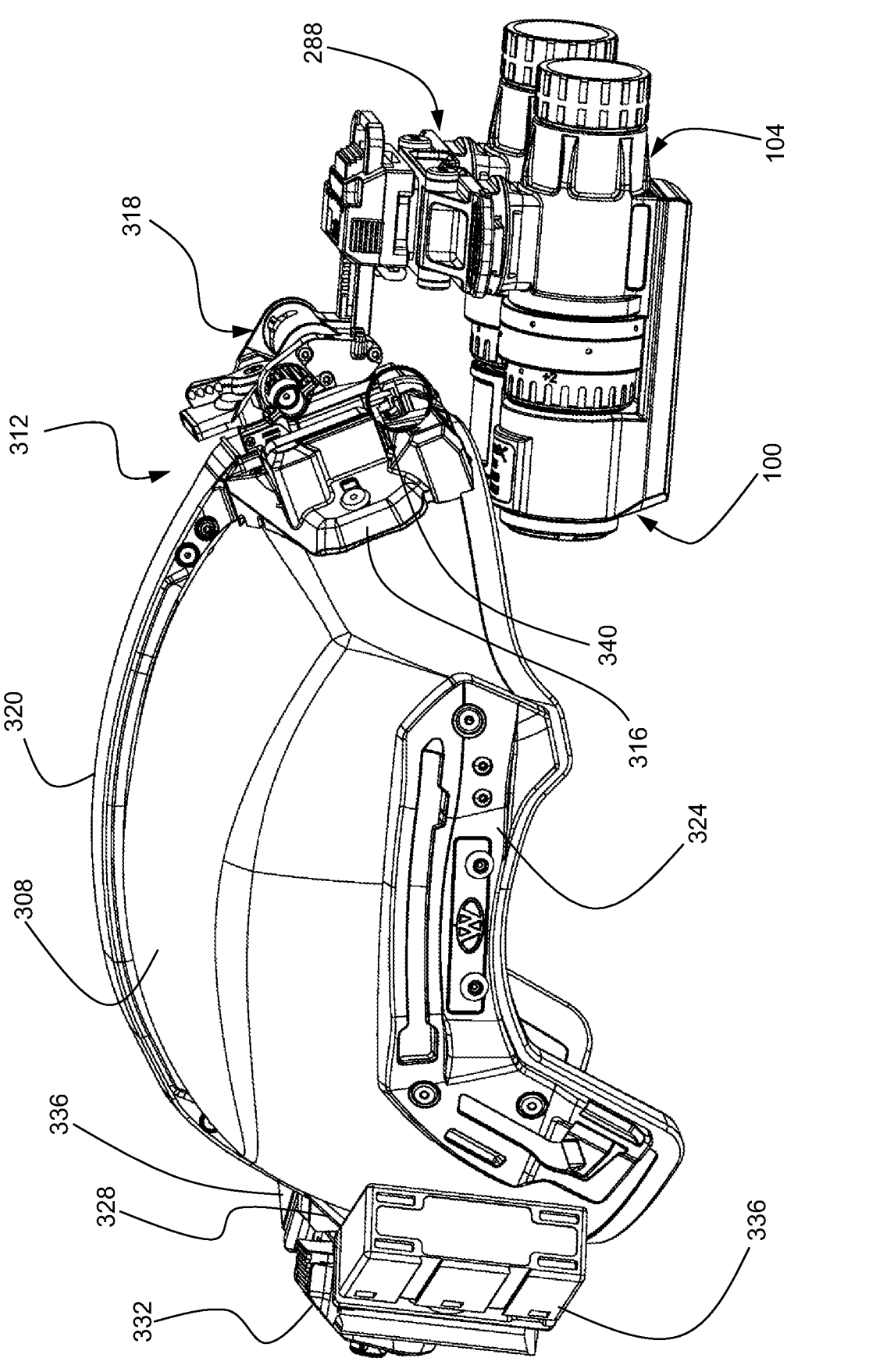
FIG. 7 is an isometric view of a helmet with a powered helmet mounting system employing the binocular system appearing in FIG. 5.

Referring now to FIG. 7, there is shown a helmet system comprising a helmet 308 and a powered helmet mounting system 312. The helmet 308 may be, for example, an Integrated Head Protection System (IHPS), Modular Integrated Communications Helmet (MICH), Advanced Combat Helmet (ACH), Enhanced Combat Helmet (ECH), among others. The powered helmet mounting system 312 includes a front shroud 316, a strap or cable cover 320 with conductive elements, side shrouds or mounting interfaces 324, e.g., left and right side shrouds or mounting interfaces.

A helmet mount assembly 318 is detachably secured to the front shroud 316. A suitable helmet mount assembly 318 is the WILCOX™ G-24 Xe powered helmet mount assembly (Wilcox Industries Corp., Newington, NH).

A rear battery mounting bracket 328 is disposed at the rear of the helmet 308. A battery pack center base module 332 is releasably attached to the rear battery mounting bracket 328. One or more batteries of battery packs, e.g., left and right battery packs, 336 are electrically and mechanically coupled to the powered helmet mounting system 312 via the rear battery mounting bracket 328. In embodiments, the batteries 336 comprise battery packs which comprise mechanical and electrical interfaces which are in accordance with a small tactical universal battery (STUB) interface standard.

The battery pack center base module 332 is a modular battery compartment with one or more internal memory devices 338 (shown in FIG. 11), which may be fixed or removable, for recording images received from the night vision recording and display module 100. Exemplary memory devices 338 include Secure Digital (SD) memory cards, micro SD memory cards, USB flash drives, Compact-Flash (CF) memory cards, Compact Quality Digital (XQD) memory cards, solid state drives (SSD), or other magnetic, electrical, optical, or opto-electronic digital storage media.

In operation, the video signal from the camera 136 is passed to the processing electronics on the circuit board 224 which converts the video signal to a digital representation and may perform additional signal processing, compression, and the like. The digital data is then transmitted to battery pack center base module 332 for storage on the digital media therein. In embodiments, the video data is transmitted to the battery pack center base module 332 via conductive circuitry, e.g., twisted pair (e.g., copper) conductors, in the powered helmet mounting system 312 that extend within the wired interface 320 and are in electrical communication with the front shroud 316 and the rear battery mounting bracket 328.

Alternatively or additionally, the digital video data is transmitted from the night vision monocular device 104 to the battery pack center base module 332 via a radio frequency (RF) communication interface. In embodiments, the front shroud 316 includes a wireless interface member 340. In embodiments, the wireless interface member 340 comprises an RF transceiver which is in wireless communication with the wireless communication module 234 on the circuit board 224. Advantageously, the RF interface is a short range, low power interface, such as Bluetooth Low Energy (BLE) or the like. In certain embodiments the wireless interface member 340 comprises an RF transceiver. In alternative embodiments, the wireless interface member 340 comprises an antenna which is in electrical communication with an RF transceiver located elsewhere, such as a wearable worn by the user. In embodiments, the battery pack center base module 332 is electronically coupled to a garment or accessory worn or carried by the user which contains an RF transceiver and wherein such RF transceiver is electrically coupled to the wireless interface member 340 via the powered helmet mounting system 312.

The video images recorded by the camera 136 may also be transmitted wirelessly, e.g., for remote storage or for real time monitoring, e.g., at a central command center. In embodiments, the video images may be transmitted via an existing cellular or Wi-Fi network. In embodiments, the video images may be transmitted via a dedicated network established for a specific mission, such as a mesh network.

As noted above, the video images to be recorded and/or transmitted using the night vision recording and display module [104] 100 may comprise the raw image output from the night vision intensifier tube or may comprise the night vision imagery combined or fused with photographic or video images from another source, such as another camera and/or images that have been prerecorded, and/or combined with the display output of the video display 148.

Figure 11:
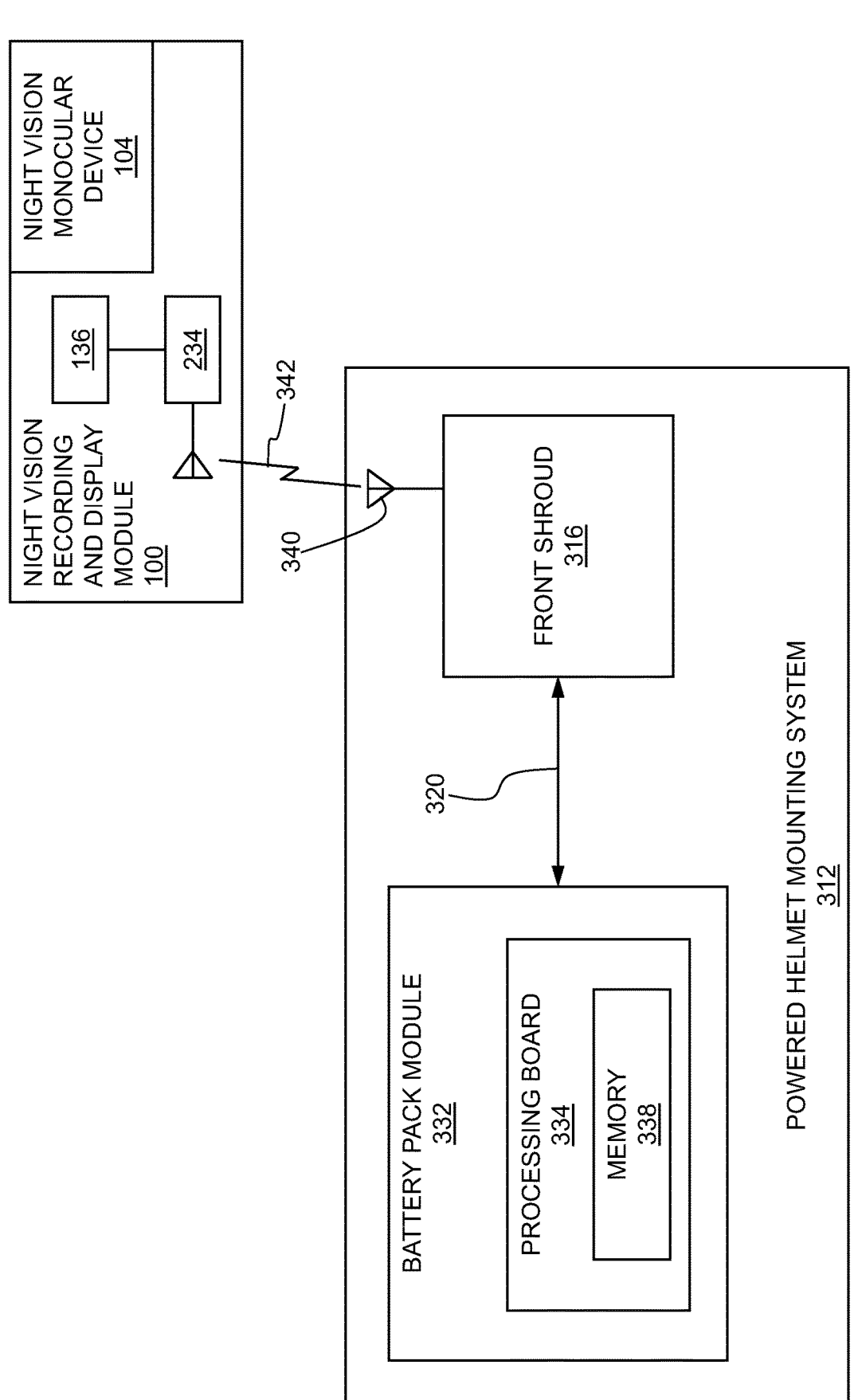
FIG. 11 is a block diagram illustrating the transmission of a video signal from the camera on the night vision recording and display module to a helmet mounted battery pack module.

Referring now to FIG. 11, in certain embodiments, the wireless interface member 340 comprises an antenna which is in electrical communication with the battery pack center base module 332 of the powered helmet mounting system via the cabled or wired interface 320. The battery pack center base module 332, which includes a main processing or mother board 334, which may be a fixed board or may be configured as a removable cartridge. The memory 338 is operably coupled to the main board 334. In operation, the video images acquired by the camera 136 of the night vision recording and display module 100 are processed by the video processor 238 and transmitted as a wireless signal 342 by the wireless communication module 234 and the antenna associated with the wireless interface member 340 on the front shroud 316 of the powered helmet mounting system 312. The signal 342 is communicated to the battery pack center base module 332 via the wired interface 320 where it is stored in the memory 338, e.g., for storage, later playback, or, further transferred via a network for remote monitoring or storage.

Figure 8B:
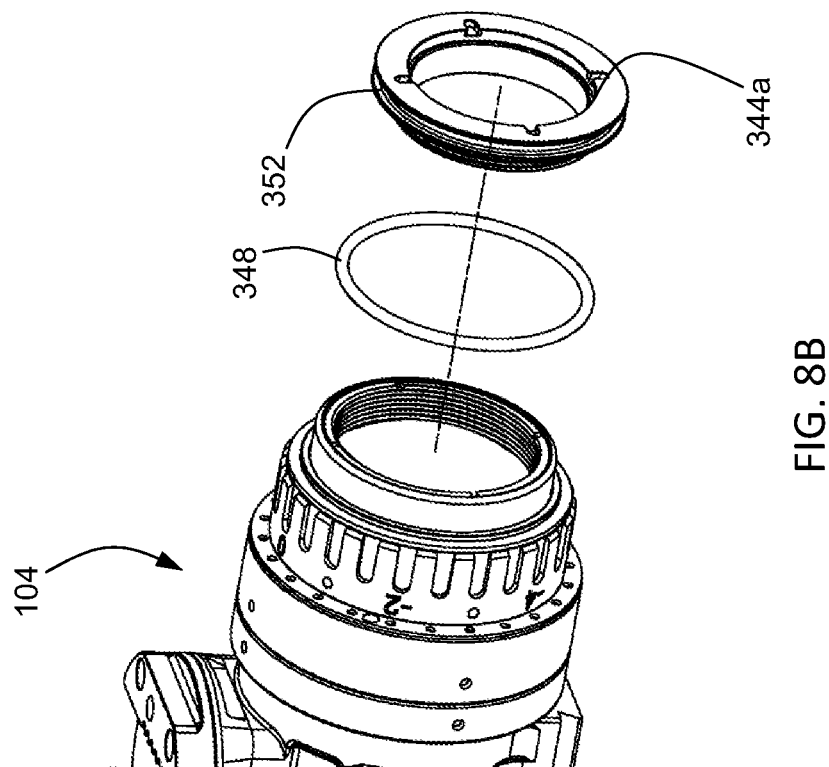
FIG. 8B is a fragmentary view of the night vision monocular device showing the replacement of the standard interface ring with a sealed interface ring.
Figure 8A:
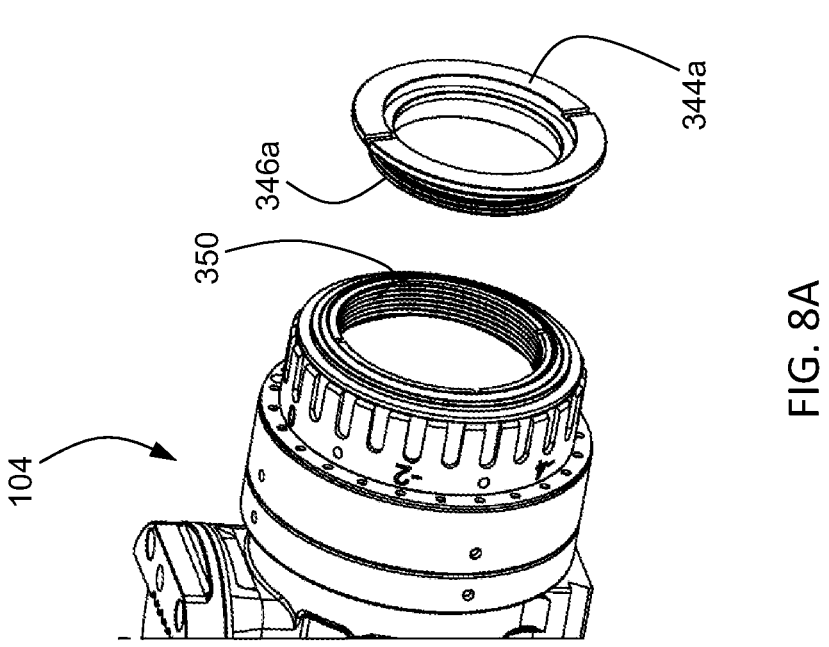
FIG. 8A is a fragmentary view of the night vision monocular device showing the removal of the standard interface ring.

Referring now to FIG. 8A, there is shown a fragmentary view of the night vision recording and display module 100 with a standard interface ring 344a being removed. The interface ring 344a includes external helical threads 346a that engage complementary threads 350 in the eyepiece aperture opening. FIG. 8B shows a fragmentary view of the night vision recording and display module 100 with a replacement interface ring 344b with a sealing ring 348 received within an annular groove 352 thereof. The interface ring 344b includes external helical threads 346b that engage the threads 350 in the eyepiece aperture opening. The replacement ring 344b and the sealing ring 348 allow a piston seal between the eyepiece 112 and the night vision recording and display module 100 housing.

Figure 9:
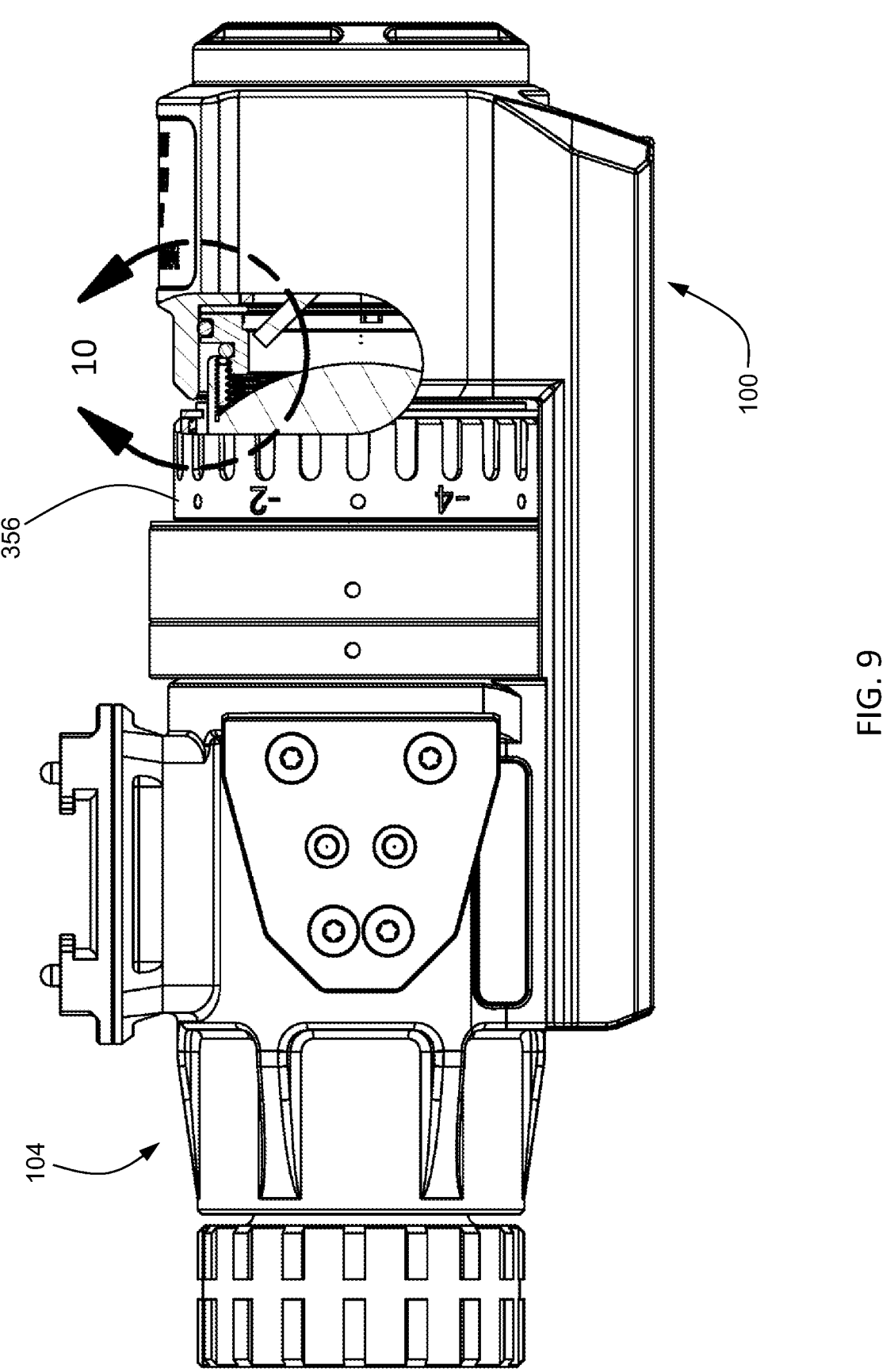
FIG. 9 is a side view of the night vision monocular device with a cutaway portion illustrating the interface between the eyepiece and the eyepiece interface ring.
Figure 10:
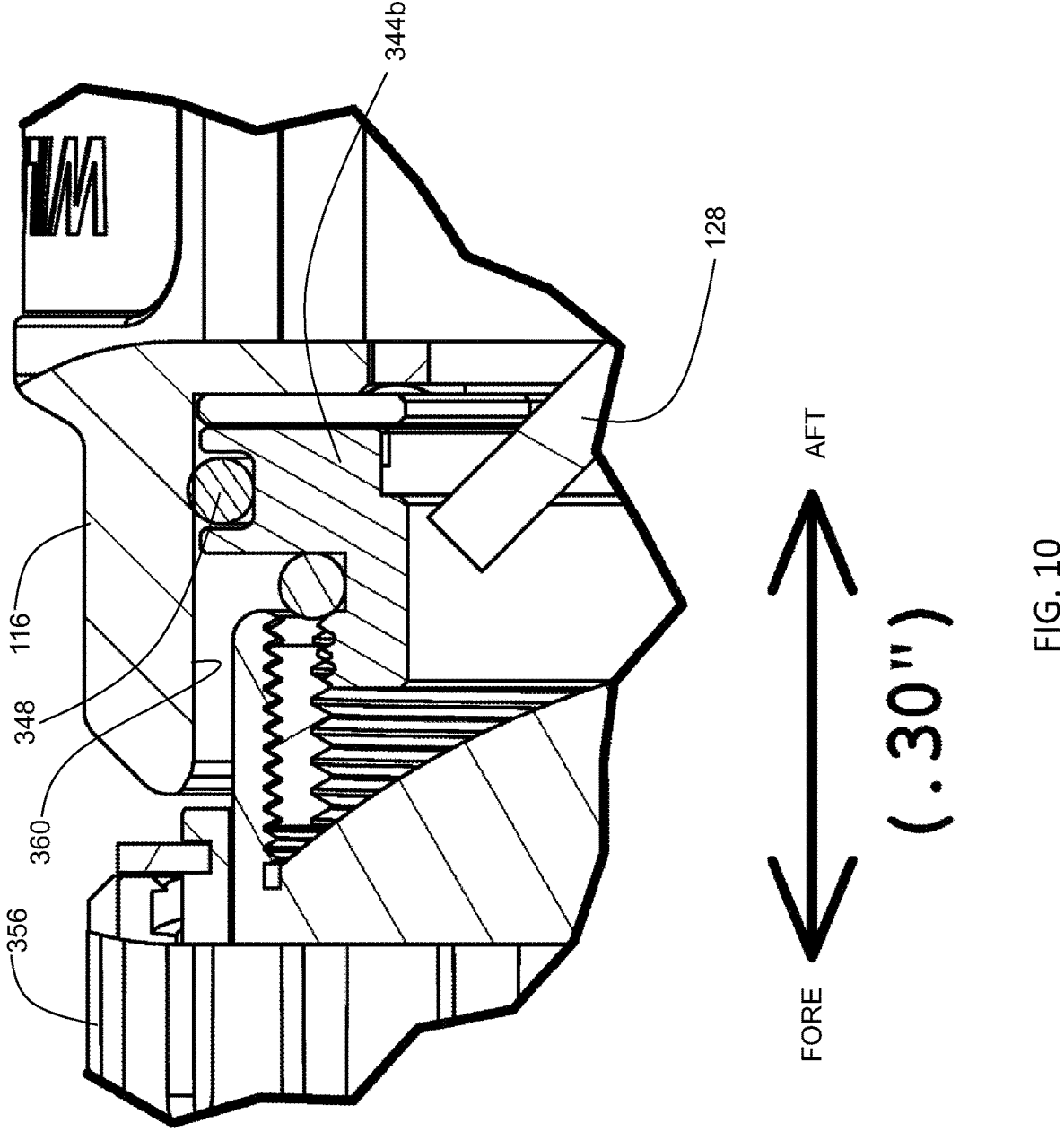
FIG. 10 is an enlarged view of the region 10 appearing in FIG. 9.

Referring now to FIGS. 9 and 10, the night vision monocular device 104 includes a rotatable diopter adjustor 356 which is rotatable to cause the eyepiece 112 to travel fore and aft relative to the user's eye to allow the user to fine-tune the focus according to the needs of the user's eyesight in that eye, independently of the other eye. Since the night vision monocular device 104 body and the night vision recording and display module 100 are in a fixed position, relative to each other, in order to provide a diopter adjustment, the eyepiece must be able to move fore and aft along the optical axis. In embodiments, the range of travel of the eyepiece is approximately 0.30 inches in relation to the night vision monocular device 104 body and the night vision recording and display module 100. The sealing ring 348 seals against entry of moisture or other environmental contamination at the sliding interface between the diopter adjuster 356 and an inner wall 360 of the housing 116 of the unit 100.

Figure 12:
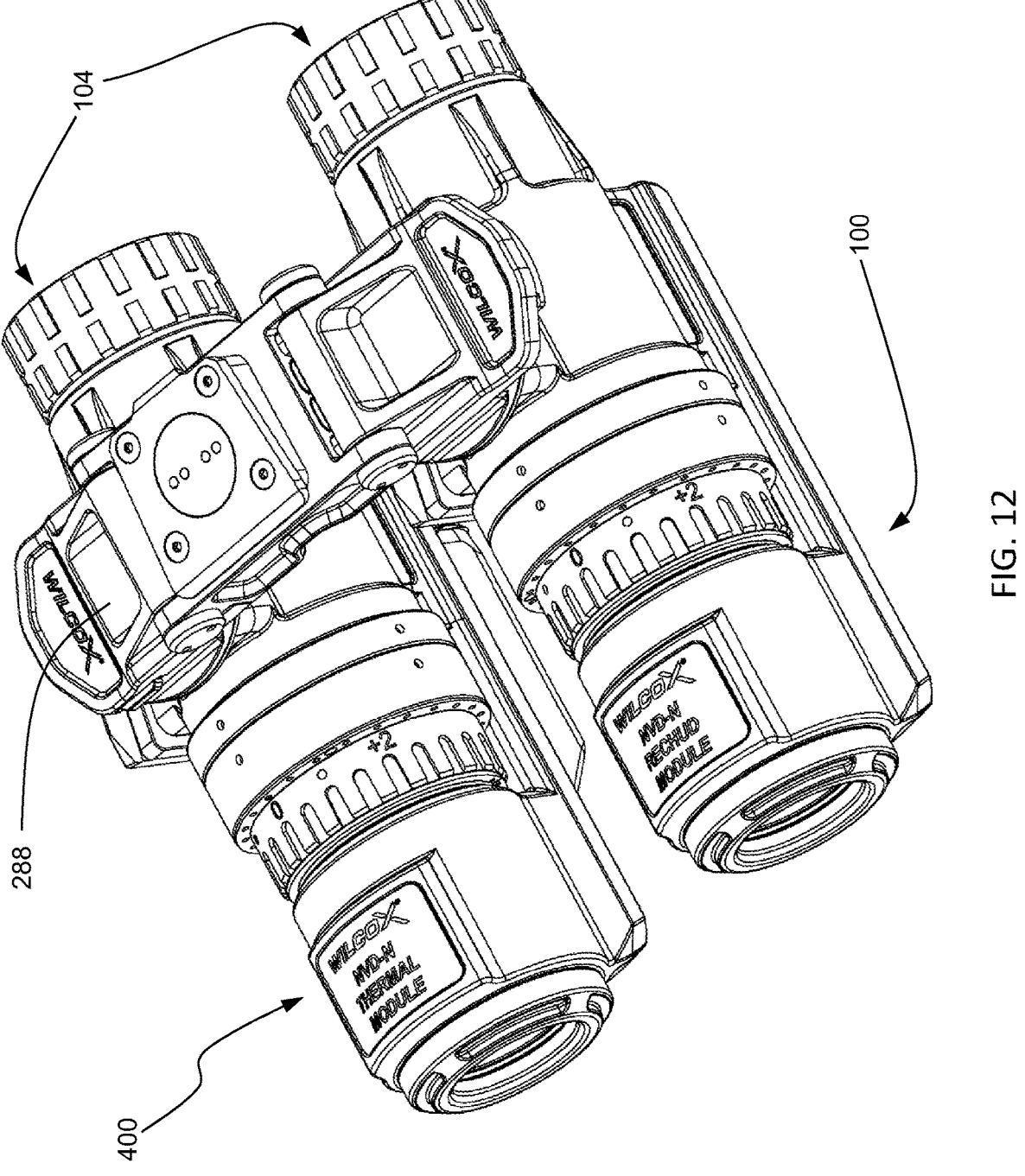
FIG. 12 is an isometric view of a binocular system comprising left and right night vision devices, having a right night vision device as shown in FIG. 1 which includes a recording and display head attached to a first night vision monocular and left night vision device as shown in FIG. 14 which includes a recording and display head having a thermal channel attached to a second monocular.
Figure 13:
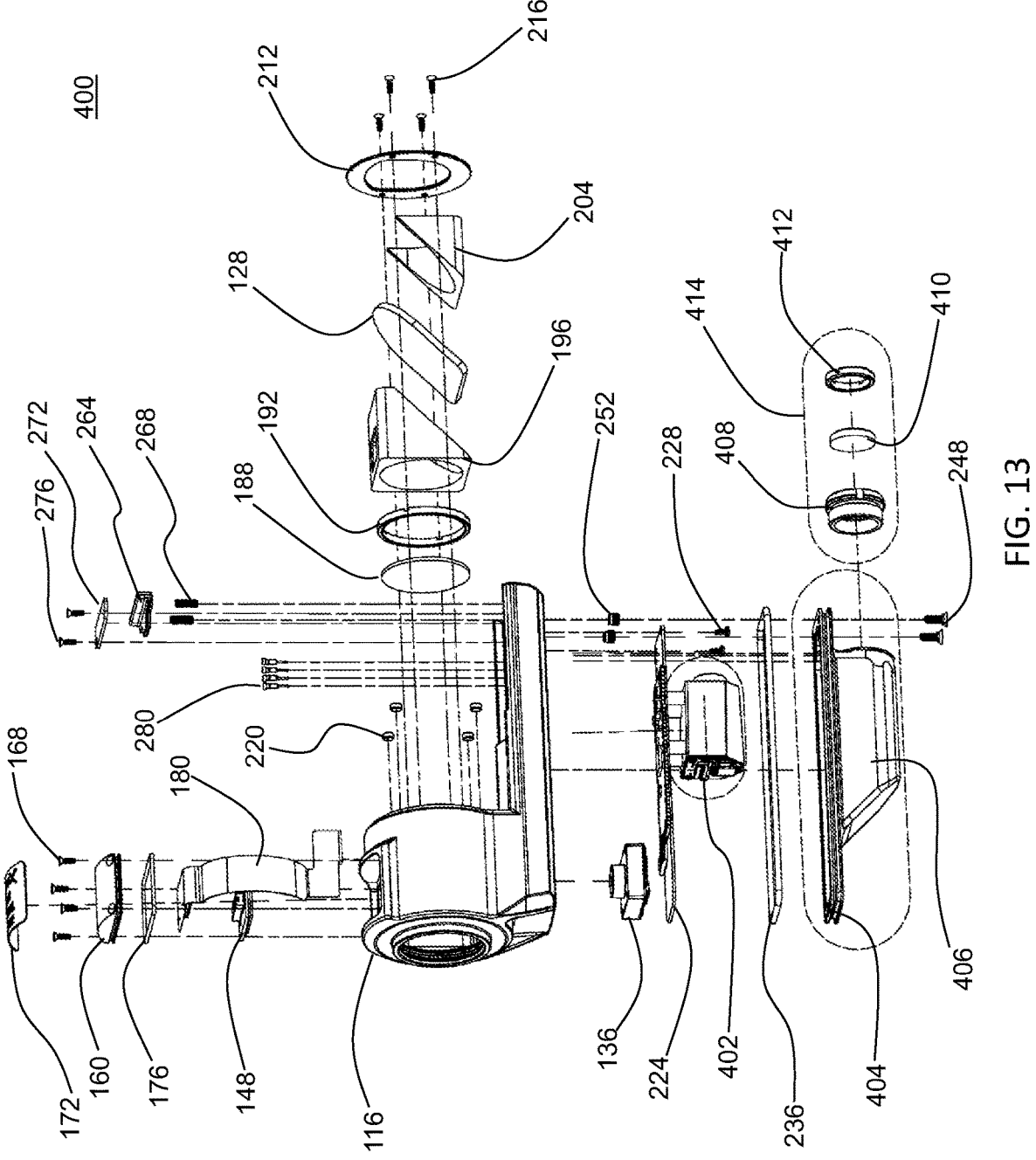
FIG. 13 is an exploded view of the recording and display head having thermal channel in accordance with a first exemplary embodiment.
Figure 14:
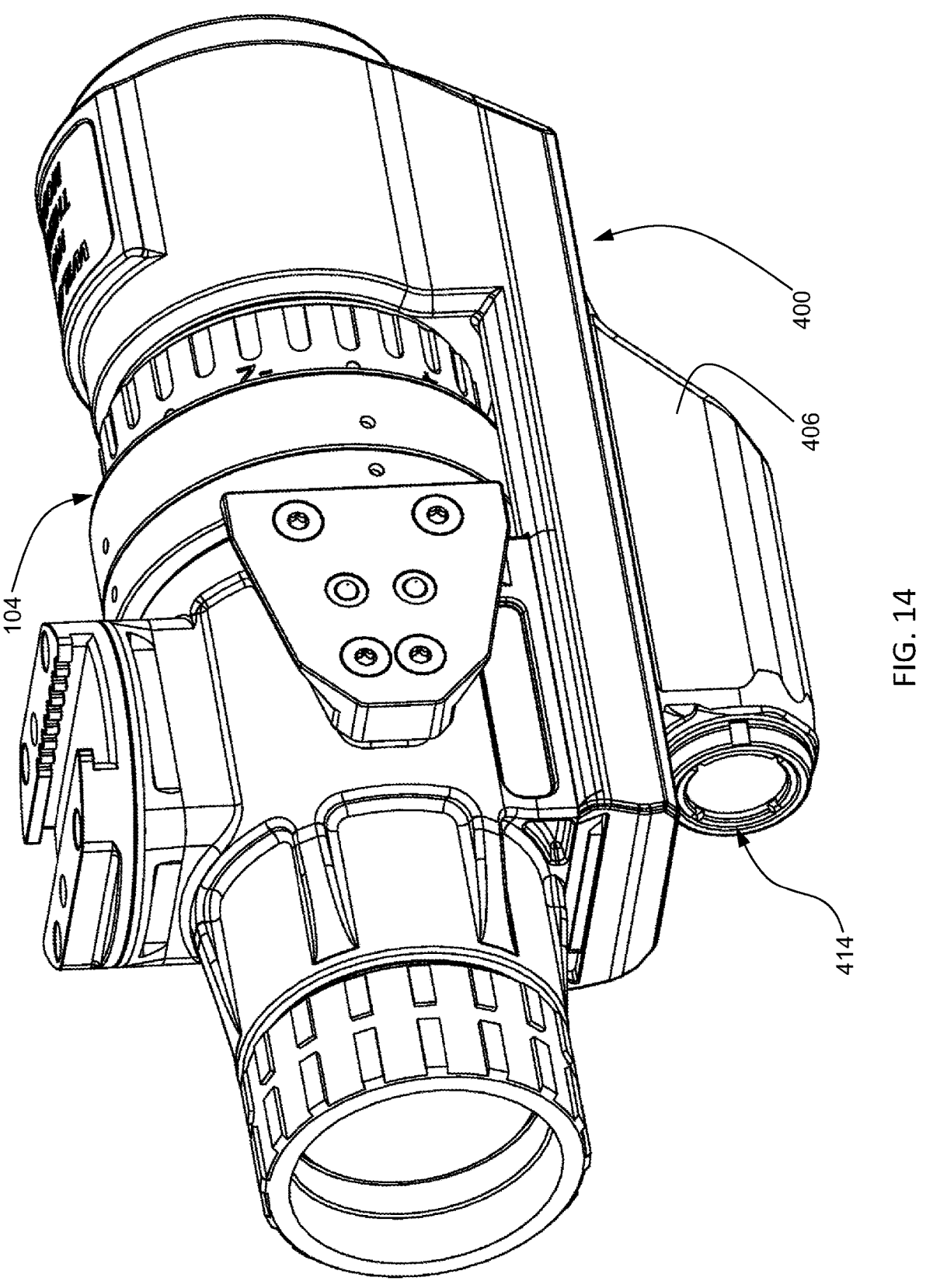
FIG. 14 is an isometric view of a modular night vision system including the recording and display head with thermal channel and a night vision monocular.
Figure 15:
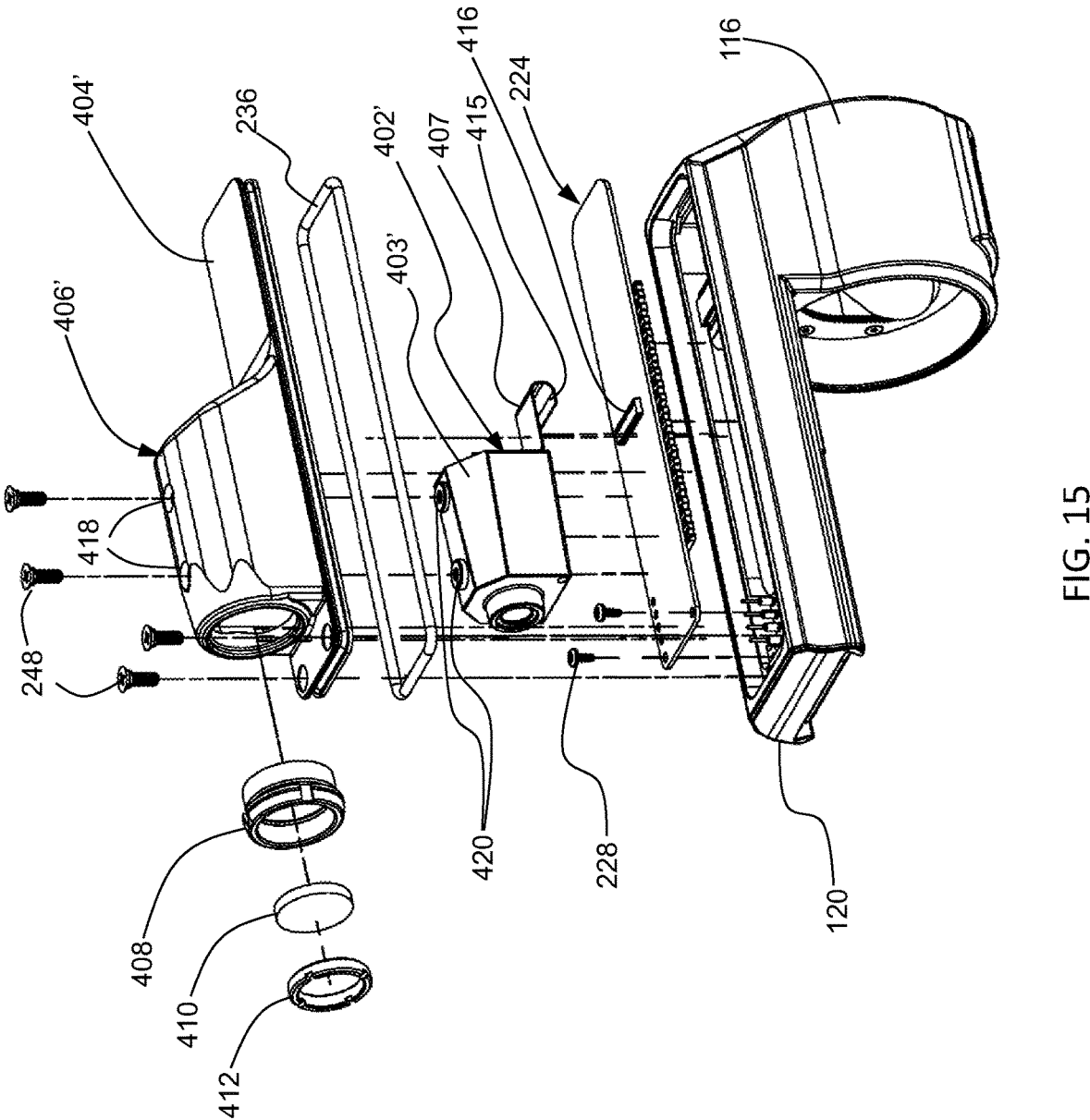
FIG. 15 is an exploded isometric view of a recording and display head having thermal channel according to a second exemplary embodiment.

Referring now to FIGS. 12-15, there is shown an alternative embodiment night vision device which may be as described above by way of reference to FIGS. 1-12, except that it further includes an additional imaging channel including a second, forward-facing camera 402, which is preferably a thermal camera. The description above in reference to any given reference numeral appearing in FIGS. 1-12 is equally applicable to the same reference numeral appearing in FIGS. 13-15, unless specifically stated otherwise. Although the development will be described herein primarily by way of reference to the illustrated preferred embodiment wherein the second camera 402 is a thermal camera, in alternative embodiments, the second camera 402 may be replaced with another type of camera, such as an infrared (IR) camera, short wave infrared (SWIR) camera, low light level camera, HGH Infrared camera, and others.

Referring now to FIG. 12, there is shown a pair of night vision monocular devices 104 configured as a binocular pair, which are attached to a powered, articulating binocular bridge 288. The bridge 288 may be as described in the aforementioned U.S. application Nos. 63/450,799 and 18/590,352. In the illustrated embodiment, the left night vision monocular device 104 has a night vision recording and display head with thermal channel 400 (sometimes referred to herein as the thermal channel 400), attached thereto and the right night vision monocular device 104 has a night vision recording and display module 100 attached thereto, as shown and described, for example, with reference to FIG. 5.

Referring now to FIG. 13, wherein features associated with the thermal camera assembly are shown encircled in broken lines, many of the structural components of the thermal channel 400 are as described above with reference to FIG. 4. A circuit board 224 of the thermal channel 400, however, includes a second camera 402, preferably a thermal camera, the second camera 402 having a housing 403 and which is adapted to process thermal images captured therefrom. The bottom cover 404 includes a thermal camera housing 406, which is shaped and dimensioned to house and protect the thermal camera 402 from the elements. The thermal camera 402 is configured so that the field of view of the camera 402 overlaps with the field of view of the night vision device 104.

A thermal lens assembly 414 is disposed at the end of the camera housing 406 over the eyepiece of the thermal camera 402. The thermal lens assembly 414 includes a thermal lens bezel 408, lens 410, and lens retainer 412. The lens 410 is preferably made of germanium for its high transparency to thermal radiation as well as its ruggedness and resistance to corrosion, but the lens 410 may be constructed of other materials, that are transmissive to thermal radiation, including without limitation zinc selenide, silicon, sapphire, calcium fluoride, barium fluoride, chalcogenide glasses, zirconium dioxide. The thermal lens bezel 408 fixes the lens 410 in place over the eyepiece of the thermal camera 402 and a lens retainer 412 secures the lens 410 to the camera housing 406.

Using the same optical design described above with reference to the night vision recording and display module 100 described above, the thermal channel 400 acquires thermal images representative of the scene being viewed and transmits the acquired thermal images as a video signal to the display 148 for display in human viewable form. A portion of the thermal image from the display 148 is reflected to the eye 144 of the user by the beam splitter 128. In this manner, the thermal image is overlaid onto the image generated by the night vision intensifier tube. In embodiments, the pixels of the video display 148 are adjusted electronically via software or firmware within the processing electronics 224 to align, scale, and/or register with the image from the intensifier tube image. In this manner, the thermal channel 400 is capable of functioning as a thermal camera and heads-up display. In embodiments, the thermal channel 400 may also record the portion of the captured thermal images that passes through the beam splitter 128.

In the illustrated embodiment, the thermal camera module 402 is secured directly to the circuit board 224. It will be recognized that other configurations are possible. For example, FIG. 15 illustrates a thermal channel video recording and display head embodiment 400' having an alternative thermal camera assembly, which may be as described above by way of reference to FIGS. 12-14, except that a thermal camera module 402' is secured to a housing 406' on a bottom cover 404' and electronically and electrically coupled to the circuit board 224 via a ribbon cable, flexible flat cable, or the like 407. The cable 407 includes a connector element 415 that engages a complementary connector element 416 on the circuit board 224. The connector elements 415, 416 may be low force connectors, such as zero insertion force (ZIF) connectors, low insertion force (LIF) connectors, or other suitable connector type. A pair of threaded fasteners 248 pass through clearance openings 418 in the housing 120 and engage threaded openings 420 in the camera housing 403'.

Referring again to FIG. 14, and with continued reference to FIGS. 12 and 13, an isometric view of the night vision monocular device 104 featuring the thermal channel 400 is illustrated in the operational position wherein the field of view of the thermal camera is substantially overlapping with the field of view of the night vision monocular device 104. In the illustrated embodiment, the camera housing 406 extends downward from the body of the night vision monocular device 104 such that the optical axis of the thermal camera 402 is parallel to the optical axis of the night vision monocular device 104. In embodiments, the thermal camera 402 is disposed within the housing portion 406 and retained therein by the thermal lens assembly 414.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A recording and display head for a night vision device, comprising:

a main housing having a viewing end and an input end, the main housing configured to couple to an output end of the night vision device;

a beam splitter received within the main housing and disposed along an optical viewing path, the optical viewing path extending between the output end of the night vision device and the viewing end, the beam splitter configured to transmit a first portion of light output by the night vision device through the beam splitter and toward the viewing end;

a video display disposed within the main housing on a first side of the beam splitter, the video display configured to output a video image along a video optical path, wherein the beam splitter is configured to reflect a portion of the video image from the video optical path to the optical viewing path;

a first camera disposed within the main housing on a second side of the beam splitter, the first camera positioned along a recording optical path, the beam splitter configured to reflect a second portion of the light output by the night vision device from the optical viewing path to the recording optical path for capture by the first camera; and an overmolded eye cup assembly configured to be detachably coupled to the viewing end, the overmolded eye cup assembly comprising:

a rigid polymer stiffener having a plurality of magnets positioned thereon, the magnets configured to align and magnetically attach to the viewing end; and a flexible eyecup formed of a moldable material overmolded about the rigid polymer stiffener.

2. The recording and display head of claim 1, wherein the display is selected from the group consisting of a liquid crystal (LCD) display, light emitting diode (LED) display, organic light emitting diode (OLED) display, active-matrix organic light-emitting diode (AMOLED) display, Super AMOLED display, microelectromechanical systems (MEMS) display, liquid crystal on silicon (LCOS) display, and digital light processing (DLP) display.

3. The recording and display head of claim 1, wherein the main housing is configured to detachably couple to the output end of the night vision device.

4. The recording and display head of claim 1, wherein the beam splitter is selected from the group consisting of a partially reflective mirror and a dichroic mirror.

5. The recording and display head of claim 1, wherein the night vision device is a night vision monocular.

6. The recording and display head of claim 1, further comprising an interface ring slidable with respect to the input end of the main housing configured to rigidly couple to an adjustable eyepiece of the night vision device, wherein sliding movement of the interface ring with respect to the main housing permits the adjustable eyepiece to travel in a fore and aft direction without relative movement between the main housing and the night vision device.

7. The recording and display head of claim 1, wherein the optical viewing path defines a longitudinal axis and further wherein the video optical path and recording optical path each extend in a direction generally transverse to the longitudinal axis.

8. The recording and display head of claim 7, wherein the video optical path and the recording optical path are spaced apart from each other along the longitudinal axis.

9. The recording and display head of claim 1, further comprising a circuit board disposed within a circuit board housing coupled to the main housing, the circuit board housing defining a detachable electrical and mechanical interface between the recording and display head and a main body of the night vision device.

10. The recording and display head of claim 9, further comprising a flex circuit on a flexible circuit substrate within the main housing, the flex circuit electrically coupling the video display and the first camera to the circuit board, wherein the flex circuit generally conforms to the inner wall of the main housing such that the flex circuit is positioned outside the viewing path, the video optical path, and the recording optical path.

11. The recording and display head of claim 9, further comprising one or both of:

a processing unit configured to execute program instructions and a memory storing instructions executable by the processing unit; and video processing electronics configured to convert a video signal from the first camera to a digital representation for storage on a digital storage medium.

12. The recording and display head of claim 9, further comprising a radio frequency (RF) communication interface configured to transmit recorded video data.

13. The recording and display head of claim 9, further comprising a second camera operably coupled to the video display, the video display configured to output video images acquired by the second camera along the video optical path.

14. The recording and display head of claim 13, wherein the second camera is a thermal camera.

15. A night vision device comprising a first night vision monocular and the recording and display head of claim 1.

16. The night vision device of claim 15, further comprising:

a second night vision monocular;

a second recording and display head comprising: a second main housing having a viewing end and an input end, the second main housing configured to couple to an output end of the second vision monocular; a second beam splitter received within the second main housing and disposed along an optical viewing path of the second recording and display head, the optical viewing path of the second recording and display head extending between the output end of the second night vision monocular and the viewing end of the second recording and display head, the second beam splitter configured to transmit a first portion of light output by the second night vision monocular through the second beam splitter and toward the viewing end of the second recording and display head; a second video display disposed within the second main housing on a first side of the second beam splitter, the second video display configured to output a video image along a video optical path of the second recording and display head, wherein the second beam splitter is configured to reflect a portion of the video image from the video optical path of the second recording and display head to the optical viewing path of the second recording and display head; and a second camera disposed within the second main housing on a second side of the second beam splitter, the second camera positioned along a recording optical path of the second recording and display head, the second beam splitter configured to reflect a second portion of the light output by the second night vision monocular from the optical viewing path of the second recording and display head to the recording optical path of the second recording and display head for capture by the second camera;

a third camera operably coupled to the second video display, the second video display configured to output video images acquired by the third camera along the video optical path of the second recording and display head; and a binocular bridge assembly configured to couple the first and second night vision monoculars together.

17. The night vision device of claim 16, wherein the third camera is a thermal camera.

\* \* \* \* \*